United States Patent
Agiwal et al.

(10) Patent No.: US 10,063,371 B2
(45) Date of Patent: Aug. 28, 2018

(54) METHOD OF PERFORMING DEVICE TO DEVICE COMMUNICATION BETWEEN USER EQUIPMENTS

(71) Applicant: Samsung Electronics Co., Ltd., Suwon-si, Gyeonggi-do (KR)

(72) Inventors: Anil Agiwal, Bangalore (IN); Rajavelsamy Rajadurai, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 14/928,184

(22) Filed: Oct. 30, 2015

(65) Prior Publication Data
US 2016/0127882 A1    May 5, 2016

(30) Foreign Application Priority Data

Oct. 30, 2014 (IN) .......................... 5430/CHE/2014
Oct. 7, 2015 (IN) .......................... 5430/CHE/2014

(51) Int. Cl.
*H04L 29/06* (2006.01)
*H04L 9/08* (2006.01)
(Continued)

(52) U.S. Cl.
CPC .......... *H04L 9/0861* (2013.01); *H04L 9/0833* (2013.01); *H04L 63/205* (2013.01);
(Continued)

(58) Field of Classification Search
CPC ... H04L 9/0861; H04L 63/122; H04L 63/205; H04L 69/22; H04W 12/02; H04W 12/04
See application file for complete search history.

(56) References Cited

U.S. PATENT DOCUMENTS

| 2013/0196631 A1* | 8/2013 | Vanderveen | .......... H04W 68/00 455/411 |
| 2013/0236016 A1* | 9/2013 | Zhang | .......... H04W 12/02 380/270 |

(Continued)

OTHER PUBLICATIONS

Qualcomm Incorporated, Introduction of ProSe Direct Communication, 3GPP TSG-RAN WG2 #87bis, Oct. 5-10, 2014, R2-144233, Shanghai, China.

(Continued)

*Primary Examiner* — Joseph P Hirl
*Assistant Examiner* — Thomas Gyorfi
(74) *Attorney, Agent, or Firm* — Jefferson IP Law, LLP (57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). In accordance with an aspect of the present disclosure, a method of transmitting data in a device to device communication system is provided. The method includes determining whether a security feature is applied to one or more packet data convergence protocol (PDCP) data units, configuring the one or more PDCP data units based on the determined result, and transmitting the one or more PDCP data units to one or more receiving user equipments (UEs).

28 Claims, 10 Drawing Sheets

(51) Int. Cl.
  *H04W 8/00* (2009.01)
  *H04W 12/10* (2009.01)
  *H04W 12/02* (2009.01)
  *H04W 12/04* (2009.01)

(52) U.S. Cl.
  CPC .......... *H04W 12/02* (2013.01); *H04L 63/162* (2013.01); *H04L 69/22* (2013.01); *H04L 2209/80* (2013.01); *H04W 12/04* (2013.01)

(56) References Cited

U.S. PATENT DOCUMENTS

| | | |
|---|---|---|
| 2013/0287012 A1 | 10/2013 | Pragada et al. |
| 2013/0290696 A1 | 10/2013 | Broustis et al. |
| 2013/0322464 A1 | 12/2013 | Yi et al. |
| 2013/0324114 A1 | 12/2013 | Raghothaman et al. |
| 2014/0112475 A1 | 4/2014 | Escott et al. |
| 2014/0119544 A1* | 5/2014 | Lee .......... H04W 4/02 380/270 |
| 2014/0198719 A1* | 7/2014 | Vanderveen .......... H04L 67/16 370/328 |
| 2014/0213250 A1 | 7/2014 | Baek et al. |
| 2015/0143463 A1* | 5/2015 | Baghel .......... H04W 12/02 726/3 |
| 2015/0245214 A1* | 8/2015 | Bellam .......... H04W 12/08 455/411 |
| 2015/0305012 A1* | 10/2015 | Yi .......... H04L 67/1078 370/329 |
| 2016/0050186 A1* | 2/2016 | Liu .......... H04L 63/0428 713/150 |
| 2016/0065362 A1* | 3/2016 | Choyi .......... H04L 63/065 380/279 |
| 2016/0127309 A1* | 5/2016 | Yun .......... H04W 4/005 709/245 |
| 2016/0191471 A1* | 6/2016 | Ryoo .......... H04W 12/04 455/411 |
| 2016/0277445 A1* | 9/2016 | Wager .......... H04W 12/00 |
| 2016/0295496 A1* | 10/2016 | Atarius .......... H04W 8/005 |
| 2016/0302137 A1* | 10/2016 | Escott .......... H04W 48/16 |
| 2016/0344782 A1* | 11/2016 | Cheng .......... H04L 65/4076 |
| 2017/0111945 A1* | 4/2017 | Yi .......... H04W 76/023 |

OTHER PUBLICATIONS

Samsung, Transferring security information in PDCP Header, 3GPP TSG SA WG3 (Security) Meeting #77, Nov. 17-21, 2014, 53-142526 San Francisco, USA.

Samsung, PDCP Header for PDCP PDUs carring unsecured PDCP SDUs, 3GPP TSG RAN WG2 Meeting #88, Nov. 17-21, 2014, R2-144817, San Francisco, USA.

European Search Report dated Oct. 20, 2017, issued in the European Application No. 15855563.1.

* cited by examiner

METHOD OF PERFORMING DEVICE TO DEVICE COMMUNICATION BETWEEN USER EQUIPMENTS

CROSS-REFERENCE TO RELATED APPLICATION(S)

This application claims the benefit under 35 U.S.C. § 119(a) of an Indian provisional patent application filed on Oct. 30, 2014 in the Indian Patent Office and assigned Serial number 5430/CHE/2014, and of an Indian complete patent application filed on Oct. 7, 2015 in the Indian Patent Office and assigned Serial number 5430/CHE/2014, the entire disclosure of each of which is hereby incorporated by reference.

TECHNICAL FIELD

The present disclosure relates to pro-se communication in $3^{rd}$ generation partnership project (3GPP). More particularly, the present disclosure relates to generating a packet data convergence protocol (PDCP) protocol data unit (PDU) depending on whether or not security is applied during transmission.

BACKGROUND

To meet the demand for wireless data traffic having increased since deployment of 4G ($4^{th}$-Generation) communication systems, efforts have been made to develop an improved 5G ($5^{th}$-Generation) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Device to device (D2D) communication is being studied in communication standard groups to enable data communication services between user equipments (UEs). During the D2D communication, a transmitting D2D UE can transmit data packets to a group of D2D UEs, broadcast data packets to all the D2D UEs, or send unicast data packets to a specific D2D UE. D2D communication between the transmitter and receiver(s) is connectionless in nature, i.e., there is no connection setup (e.g., no control messages are exchanged) between the transmitter and receiver before the transmitter starts transmitting the data packets. During the transmission, the transmitter includes a source identification (ID) and destination ID in the data packets. The source ID is set to the UE ID of the transmitter. The destination ID is the intended recipient of the transmitted packet. The destination ID indicates whether the packet is a broadcast packet or a unicast packet or a packet intended for a group.

Figure 1:
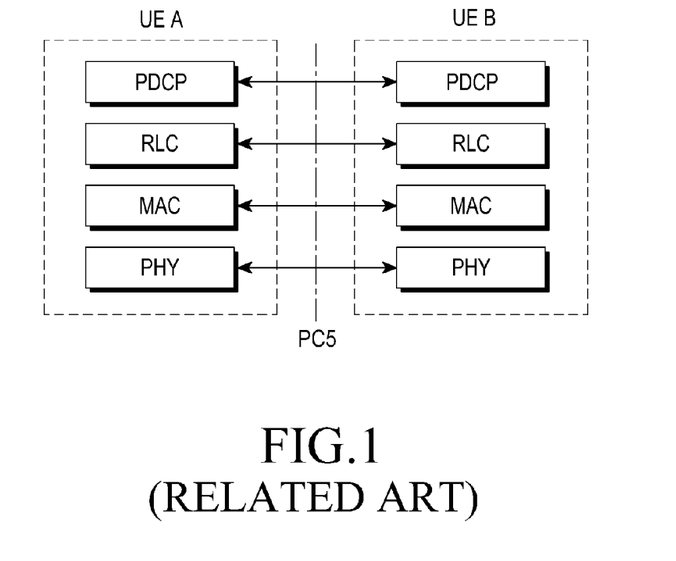
FIG. 1 is a schematic diagram illustrating a protocol stack for device to device (D2D) communication according to the related art.

FIG. 1 is a schematic diagram illustrating a protocol stack for D2D communication according to the related art.

Referring to FIG. 1, the packet data convergence protocol (PDCP) layer in the transmitter receives the data packets, i.e., Internet protocol (IP) packets or address resolution protocol (ARP) packets (PDCP service data units (SDUs)) from an upper layer. It secures the packet and also compresses the IP headers of IP packets. The processed packet PDCP protocol data unit (PDU) is sent to radio link control (RLC) layer. The RLC layer receives the PDCP PDUs (RLC SDUs) from the PDCP layer. It fragments the PDCP PDUs if needed and sends the RLC PDUs to a media access control (MAC) layer. The MAC layer multiplexes the RLC PDUs (or MAC SDUs) and sends the MAC PDU to a physical (PHY) layer for transmission on a PC5 interface (e.g., a wireless channel).

Figure 2:
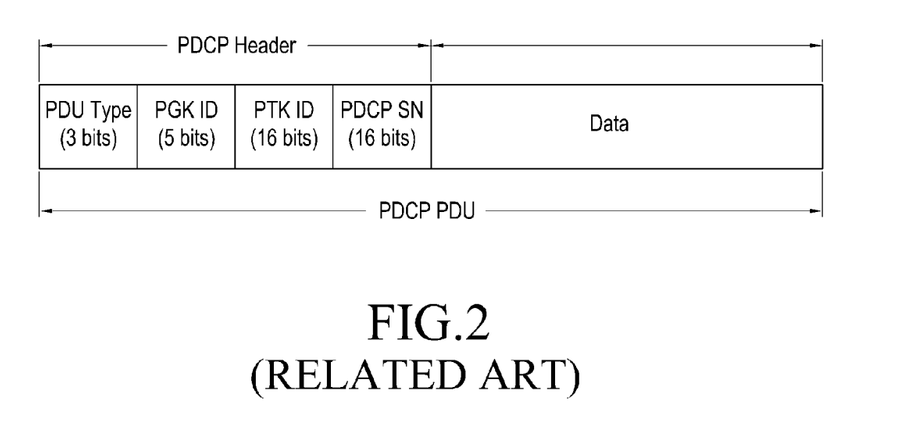
FIG. 2 is a schematic diagram illustrating a packet data convergence protocol (PDCP)protocol data unit (PDU) for D2D communication according to the related art.

FIG. 2 is a schematic diagram illustrating a PDCP PDU for D2D communication according to the related art.

Referring to FIG. 2, the PDCP layer adds a PDCP header to each PDCP SDU. The PDCP header comprises of PDU type, pro-se group key (PGK) ID, pro-se traffic key (PTK) ID and PDCP sequence number (SN). The PDU type indicates whether the data in PDCP PDU is an ARP packet or an IP packet. In order to support the security a PGK is defined. PGK is specific to a group of D2D UEs. Multiple PGKs per group can be pre-provisioned in a UE. Each of these PGKs for the same group is identified using an 8 bit PGK ID. If a UE wants to send data packets to a group, then it derives a PTK from the PGK corresponding to that group. The PTK is identified using PTK ID. PTK is a group member specific key generated from the PGK. Each PTK is also associated with a 16 bit counter (or PDCP SN). The counter (or PDCP SN) is updated for every packet transmitted.

The transmitter always adds the PDCP header with the PDU type, PGK ID, PTK ID and PDCP SN in every PDCP PDU. The receiver always parses these four fields in every PDCP PDU. The transmitter and receiver always encrypt/decrypt the data in PDCP PDUs respectively.

In some D2D communication systems, whether or not to apply the security (e.g., encryption and/or integrity protection) can be configurable. In the case that the transmitter does not apply security, then the related art approach does not work as the receiver always assumes that data is encrypted in every PDCP PDU and using the PDCP security information in the PDCP header, the receiver derives the security keys and decrypts the data.

In some D2D communication system, a UE can be in coverage of network and another UE can be in out of network coverage. UE in coverage of network can receive the security configuration information from the network, while out of coverage UE must rely on pre-configuration or may not apply security in the absence of security configuration information. In the case that the receiving UE is in coverage and always assumes that data is encrypted in every PDCP PDU then communication will fail as the receiver attempts to decrypt the PDU which is not encrypted.

Thus, there is a need for a method to generate the PDCP PDU depending on whether or not the security is applied. Further, it is required to reduce the overhead in the radio interface by avoiding transmitting redundant information, especially when security is not applied, then it is not required to send the security information in the PDCP header.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of performing device to device communication between user equipments (UEs).

In accordance with an aspect of the present disclosure, a method of transmitting data in a device to device communication system is provided. The method includes determining whether a security feature is applied to one or more packet data convergence protocol (PDCP) data units, and configuring the one or more PDCP data units based on the determined result, and transmitting the one or more PDCP data units to one or more receiving user equipments (UEs).

In accordance with an aspect of the present disclosure, a method of receiving data in a device to device communication system is provided. The method includes receiving one or more packet data convergence protocol (PDCP) data units, and processing the one or more PDCP data units configured based on whether a security feature is applied to one or more packet data convergence protocol (PDCP) data units.

In accordance with an aspect of the present disclosure, an apparatus of transmitting data in a device to device communication system is provided. The apparatus includes a controller for determining whether a security feature is applied to one or more packet data convergence protocol (PDCP) data units and configuring the one or more PDCP data units based on the determined result, and a transmitter for transmitting the one or more PDCP data units to one or more receiving user equipments (UEs).

In accordance with an aspect of the present disclosure, an apparatus of transmitting data in a device to device communication system is provided. The apparatus includes a receiver for receiving one or more packet data convergence protocol (PDCP) data units, and a controller for processing the one or more PDCP data units configured based on whether a security feature is applied to one or more packet data convergence protocol (PDCP) data units.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those or ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be further understood that the terms "includes", "comprises", "including" and/or "comprising" when used in this specification, specify the presence of stated features, integers, operations, elements and/or components, but do not preclude the presence or addition of one or more other features integers, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Any name or term (which is registered trademark/copyright) used in the specification is only for the purpose of explaining the present disclosure and not for any commercial gain.

The present disclosure describes a method to generate the packet data convergence protocol (PDCP) protocol data unit (PDU) depending on whether or not a security feature is applied during pro-se communication in $3^{rd}$ generation partnership project (3GPP).

Embodiment 1

Figure 3:
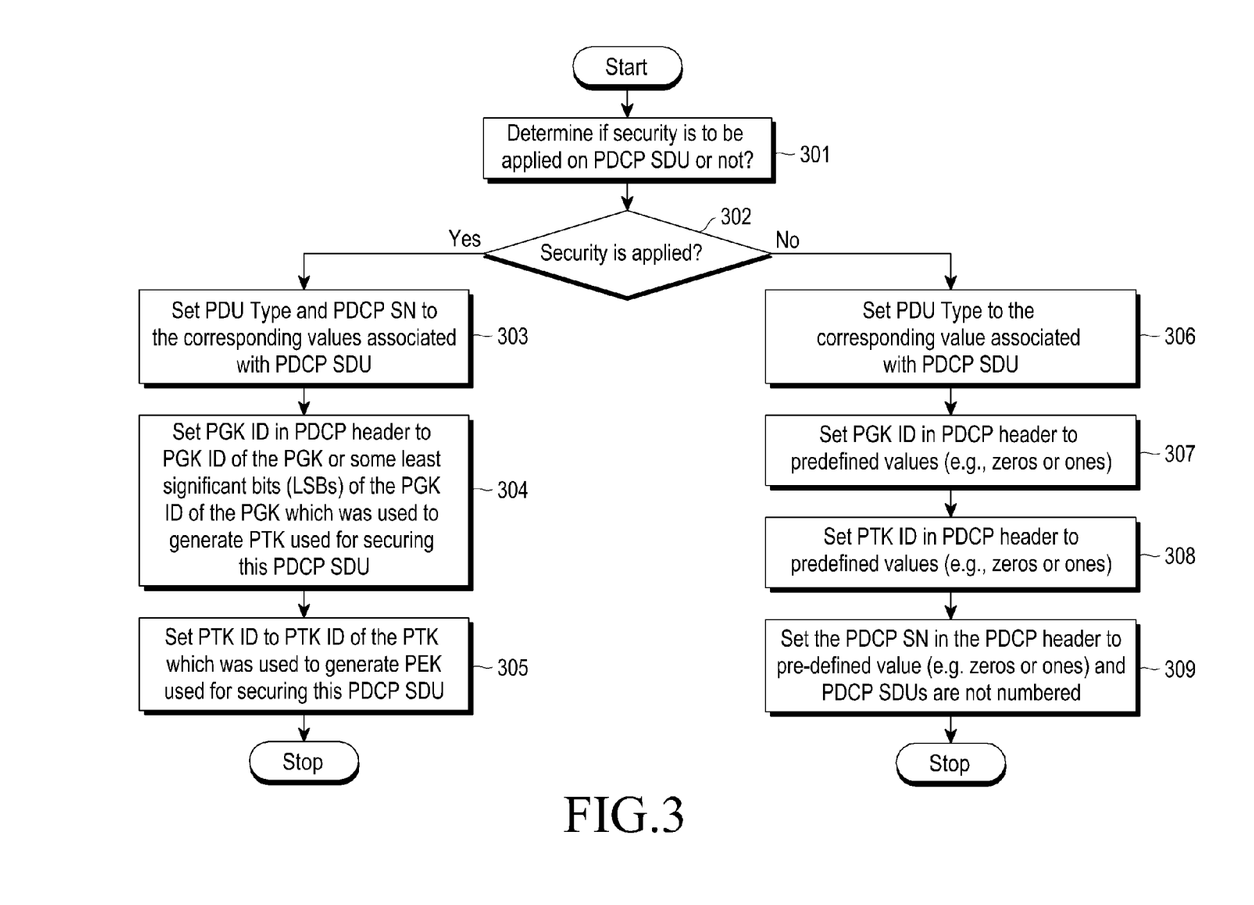
FIG. 3 is a flowchart illustrating a PDCP entity operation in the transmitter for generating the PDCP PDU according to an embodiment of the present disclosure.

FIG. 3 is a flowchart illustrating a PDCP entity operation in the transmitter for generating the PDCP PDU according to an embodiment of the present disclosure.

Referring to FIG. 3, in this method of the present disclosure, the transmitter adds the same PDCP header irrespective of whether or not a security feature (e.g., ciphering) is applied on the data (i.e., PDCP service data unit (SDU)) by a PDCP entity. In an embodiment of the present disclosure, the pro-se configuration information provided by the network (which is stored in the secure element (e.g., a universal integrated circuit card (UICC)) of the device) indicates to PDCP whether or not security feature (e.g. ciphering) should be applied to PDCP SDUs for a particular destination identification (ID), for all destination IDs, or for a particular PDU SDU type (e.g., a relay SDU, signaling SDU, address resolution protocol (ARP) SDU, etc.). In an embodiment of the present disclosure, whether or not to apply a security feature (e.g., ciphering) is configured by the pro-se key management function or pro-se function in the network. In an embodiment of the present disclosure, the upper layer indicates to PDCP whether or not a security feature (e.g., ciphering) should be applied to PDCP SDUs by the PDCP entity. Whether or not a security feature (e.g., ciphering) should be applied to PDCP SDUs can be indicated for a particular destination ID, for all destination IDs, or for a particular PDU SDU type (e.g., a relay SDU, signaling SDU, ARP SDU, etc.). Upper layer may indicate not to apply a security feature in PDCP if the security is already applied to the PDCP SDU at the upper layer. If the security feature is applied, then PDCP generates the PDCP PDU by adding the PDCP header and including the PDU type, pro-se group key (PGK) ID and pro-se traffic key (PTK) ID and PDCP sequence number (SN) values associated with the PDCP SDU in the PDCP PDU. If the security feature is not applied, then PDCP generates the PDCP PDU by adding the PDCP header and setting the PDU type associated with the PDCP SDU in the PDCP PDU. The PGK ID and PTK ID are set to predefined values. In one embodiment of the present disclosure, they can be set to zeroes. In another embodiment of the present disclosure, they can be set to ones. The pre-defined values of PGK ID and/or PTK ID indicated in the PDCP header when the security feature is not applied are used to identify (i.e., should be excluded from values used to identify PGK and PTK when the security is applied) PGK and PTK when the security feature is applied. In an embodiment of the present disclosure, the PDCP SDUs are not numbered if the security is not applied, and the PDCP SN in the PDCP header is set to a pre-defined value. The pre-defined value can be zero.

In an embodiment of the present disclosure, the transmitter determines if a security feature is to be applied on a PDCP SDU or not, at operation 301. At operation 302, the security feature is either applied or not based on the information received from the operation 301. If the security feature is applied, at operation 303, PDCP entity encrypts the PDCP SDU. PDU Type and PDCP SN are set to the corresponding values associated with PDCP SDU. At operation 304, PGK ID is set in the PDCP header to the PGK ID of the PGK or some least significant bits (LSBs) of the PGK ID of the PGK which was used to generate PTK used for securing this PDCP SDU. At operation 305, the PTK ID is set to the PTK ID of the PTK which was used to generate a pro-se encryption key (PEK) used for securing this PDCP SDU. The encrypted PDCP SDU is transmitted together with PDCP header to a receiver.

If a security feature is not to be applied, PDCP entity does not encrypt the PDCP SDU. PDU type is set to the corresponding value associated with PDCP SDU at operation 306. At operation 307, the PGK ID is set in the PDCP header to predefined values (e.g., zeros or ones). At operation 308, the PTK ID is set in the PDCP header to predefined values (e.g., zeros or ones). At operation 309, PDCP SDUs are not numbered and the PDCP SN in the PDCP header is set to a pre-defined value (e.g., zeros or ones). The unencrypted PDCP SDU is transmitted together with PDCP header to the receiver.

Figure 4:
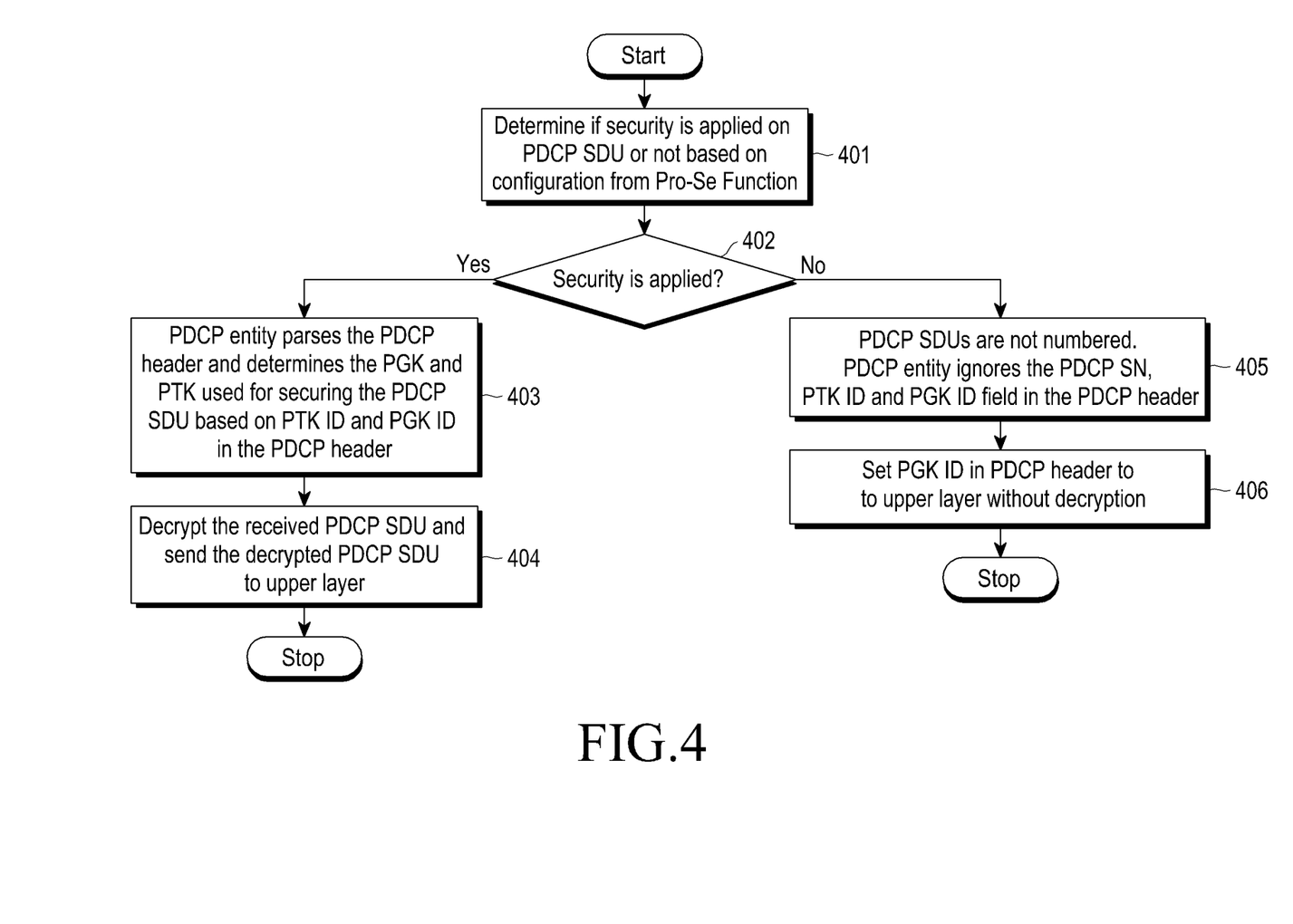
FIG. 4 is a flowchart illustrating a PDCP entity operation in the receiver according to an embodiment of the present disclosure.

FIG. 4 is a flowchart illustrating a PDCP entity operation in the receiver according to an embodiment of the present disclosure.

Referring to FIG. 4, in an embodiment of the present disclosure, the receiver knows whether or not the security feature is applied to the PDCP SDU based on configuration information received from a network (which is stored in the secure element (UICC) of the device). In an embodiment of the present disclosure, whether or not the security feature (e.g., ciphering) is applied is configured by the pro-se key management function or pro-se function in the network. In an embodiment of the present disclosure, the upper layer indicates to PDCP whether or not the security feature is applied to PDCP SDUs. If the security feature is applied, the PDCP entity parses the PDCP header and determines the PGK and PTK used for securing the PDCP SDU based on the PTK ID and PGK ID in the PDCP header. The PDCP entity also parses the PDCP header and determines the PDCP SN. If the security feature is not applied, then the PDCP entity ignores the PTK ID and PGK ID fields in the PDCP header. In an alternate embodiment of the present disclosure, wherein PDCP SDUs are not numbered if the security feature is not applied, then the PDCP entity ignores the PDCP SN, PTK ID, and PGK ID fields in the PDCP header.

In an embodiment of the present disclosure, the receiver process the data received from the transmitter to determine if security feature is applied on the PDCP SDU or not based on configuration information from a pro-se function or pro-se key management function, at operation 401. At operation 402, a check is performed of whether or not the security feature is applied based on the information received from the operation 401. At operation 403, the PDCP entity parses the PDCP header and determines the PDCP SN, PGK, and PTK used for securing the PDCP SDU based on the PTK ID and PGK ID in the PDCP header when the security feature is applied. At operation 404, the received PDCP SDU is decrypted and sent to upper layer. In an embodiment of the present disclosure, the upper layer includes, but is not limited to, non-access stratum (NAS) protocol, pro-se protocol, application, internet protocol (IP), ARP protocol, and signaling protocol.

At operation 405, the PDCP SDUs are not numbered if the security feature is not applied, and the PDCP entity ignores the PDCP SN, PTK ID, and PGK ID fields in the PDCP header. In an alternate embodiment of the present disclosure at operation 405, the PDCP entity ignores the PTK ID and PGK ID fields in the PDCP header when the security feature is not applied. At operation 406, the PDCP entity sends the received PDCP SDU to upper layer without decryption. In an embodiment of the present disclosure, the upper layer includes, but is not limited to, NAS protocol, pro-se protocol, application, IP protocol, ARP protocol, and signaling protocol.

Figure 5:
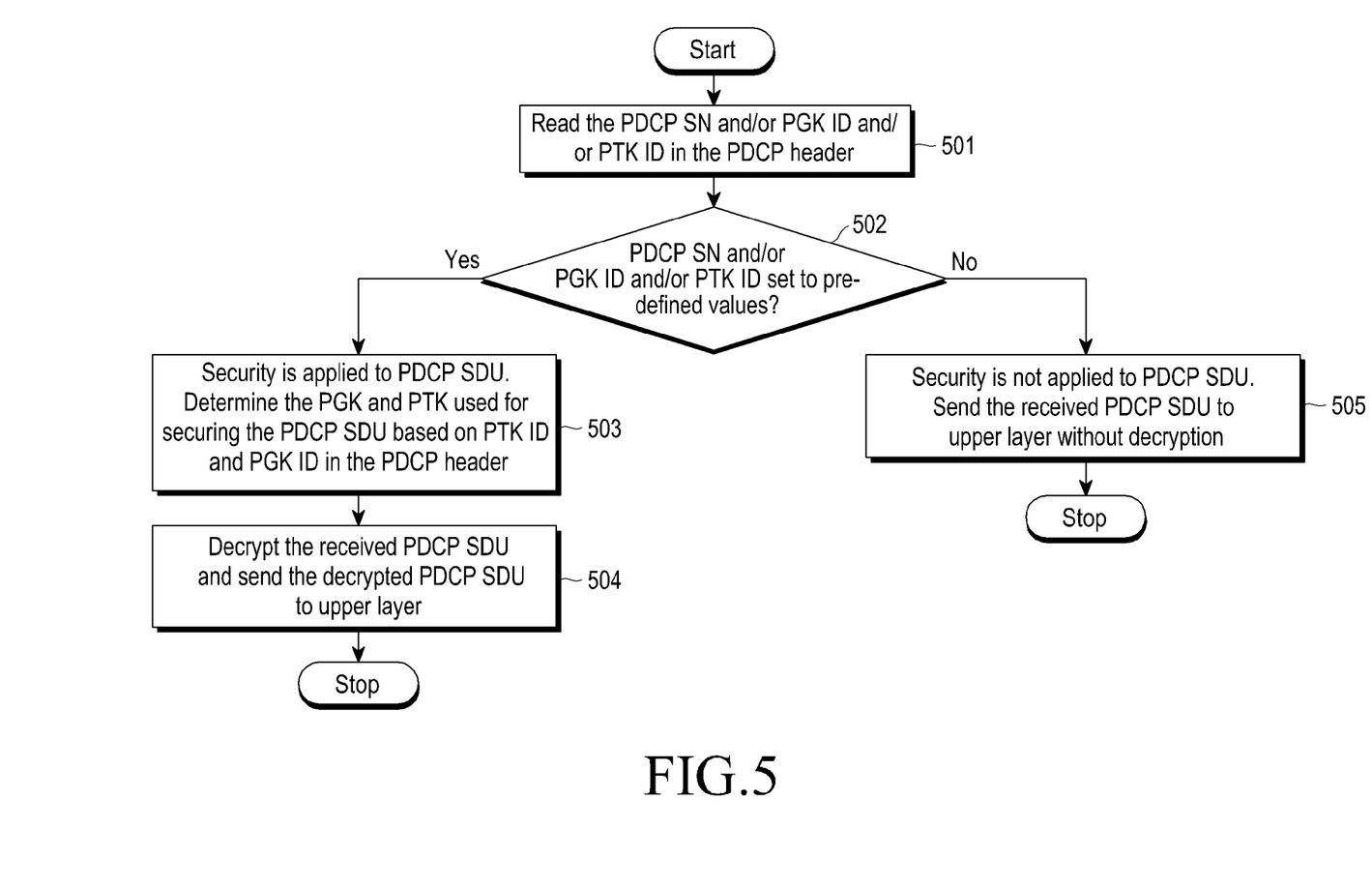
FIG. 5 is a flowchart illustrating a PDCP entity operation in the receiver according to an embodiment of the present disclosure.

FIG. 5 is a flowchart illustrating a PDCP entity operation in the receiver according to an embodiment of the present disclosure.

Referring to FIG. 5, in this embodiment of the present disclosure, the receiver determines whether or not the security feature is applied to the PDCP SDU based on the PGK ID and/or PTK ID field values in the PDCP header. If the PGK ID and/or PTK ID are set to predefined values, then the PDCP entity interprets that the security feature is not applied to the PDCP SDU; otherwise, it interprets that the security feature is applied to the PDCP SDU. In an alternate embodiment of the present disclosure, the receiver determines whether or not the security feature is applied to the PDCP SDU based on the PDCP SN and/or PGK ID and/or PTK ID field values in the PDCP header. If the PDCP SN and/or PGK ID and/or PTK ID are set to the predefined values, then the PDCP entity interprets that the security feature is not applied to the PDCP SDU; otherwise, it interprets that the security feature is applied to the PDCP SDU.

At operation 501, the receiver reads the PGK ID and/or PTK ID information in the received PDCP header. At operation 502, a check is performed of whether the PGK ID and/or PTK ID is set to the pre-defined values. At operation 503, the receiver observes that the security feature is applied to PDCP SDU when the PGK ID and/or PTK ID is not set to the pre-defined values. In an alternate embodiment of the present disclosure, at operation 501, the receiver reads the PDCP SN and/or PGK ID and/or PTK ID information in the received PDCP header. At operation 502, a check is performed of whether the PDCP SN and/or PGK ID and/or PTK ID is set to the pre-defined values. At operation 503, the receiver observes that the security feature is applied to the PDCP SDU when the PDCP SN and/or PGK ID and/or PTK ID is not set to the pre-defined values. The PGK and PTK used for securing the PDCP SDU are determined based on the PTK ID and PGK ID in the PDCP header. At operation 504, the received PDCP SDU is decrypted and sent to the upper layer. In an embodiment of the present disclosure, the upper layer includes, but is not limited to, NAS protocol, pro-se protocol, application, IP protocol, ARP protocol, and signaling protocol.

At operation 505, the receiver observes that the security feature is not applied to the PDCP SDU when the PGK ID and/or PTK ID is set to the pre-defined values. Alternately, at operation 505, the receiver observes that the security feature is not applied to the PDCP SDU when the PDCP SN and/or PGK ID and/or PTK ID is set to the pre-defined values. The received PDCP SDU is sent to upper layer without decryption. In an embodiment of the present disclosure, the upper layer includes, but is not limited to, NAS protocol, pro-se protocol, application, IP protocol, ARP protocol, and signaling protocol.

Embodiment 2

Figure 6:
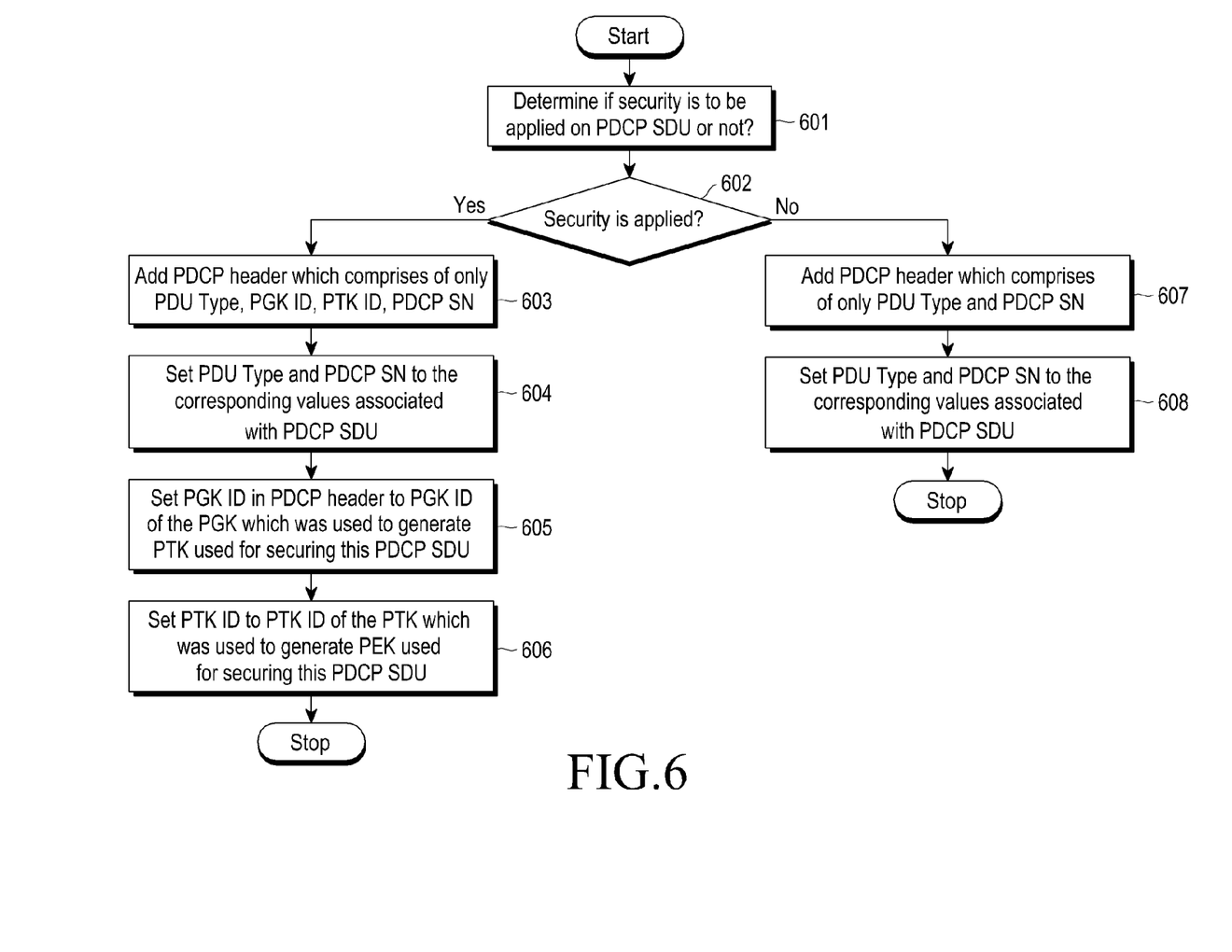
FIG. 6 is a flowchart illustrating a PDCP entity operation in the transmitter for generating the PDCP PDU according to an embodiment of the present disclosure.

FIG. 6 is a flowchart illustrating a PDCP entity operation in the transmitter for generating the PDCP PDU according to an embodiment of the present disclosure.

Referring to FIG. 6, in this embodiment of the present disclosure, the transmitter adds a different type of PDCP header depending on whether or not the security feature (e.g., ciphering) is applied on the data (i.e., a PDCP SDU). In an embodiment of the present disclosure, the pro-se configuration information provided by the network (which is stored in the secure element (UICC) of the device) indicates to PDCP whether or not the security feature (e.g., ciphering) should be applied to PDCP SDUs by the PDCP entity for a particular destination ID, all destination IDs, or a particular PDU SDU type (e.g., a relay SDU, signaling SDU, ARP SDU, etc.). In an embodiment of the present disclosure, whether or not to apply the security feature (e.g., ciphering) is configured by the pro-se key management function or pro-se function in the network. In an embodiment of the present disclosure, the upper layer indicates to PDCP whether or not the security feature should be applied to PDCP SDUs. Whether or not the security feature (e.g., ciphering) should be applied to PDCP SDUs, can be indicated for a particular destination ID, for all destination IDs, or for a particular PDU SDU type (e.g., a relay SDU, signaling SDU, ARP SDU, etc.). Upper layer may indicate not to apply the security feature in PDCP if the security is already applied to the PDCP SDU at the upper layer. If the security feature is applied, then PDCP generates the PDCP PDU by adding the PDCP header and setting the PDU type, PGK ID, PTK ID, and PDCP SN associated with the PDCP SDU in the PDCP PDU. If the security feature is not applied, then PDCP generates the PDCP PDU by adding the PDCP header wherein the PDCP header comprises of PDU type and PDCP SN fields only. These fields are set to the PDU type and PDCP SN associated with the PDCP SDU in the PDCP PDU. The PGK ID and PTK ID are not included in the PDCP header.

In an embodiment of the present disclosure, an indicator is provided in the PDCP header which indicates whether or not the PGK ID and PTK ID are included in the PDCP header.

At operation 601, the transmitter determines if the security feature is to be applied on the PDCP SDU or not. At operation 602, the security feature is either applied or not, based on information received from the operation 601. At operation 603, the PDCP entity encrypts the PDCP SDU and the PDCP header is added to data, i.e., a PDCP SDU, which comprises of only PDU type, PGK ID, PTK ID, and PDCP SN when the security feature is applied. At operation 604, the PDU type and the PDCP SN are set to the corresponding values associated with the PDCP SDU. At operation 605, the PGK ID in the PDCP header is set to the PGK ID of the PGK which was used to generate the PTK used for securing this PDCP SDU. At operation 606, the PTK ID is set to the PTK ID of the PTK which was used to generate the PEK used for securing this PDCP SDU. The encrypted PDCP SDU is transmitted together with the PDCP header to the receiver.

At operation 607, the PDCP entity does not encrypt the PDCP SDU. The PDCP header is added to the data, which comprises of only the PDU type and PDCP SN, when the security feature is not applied. At operation 608, the PDU type and the PDCP SN are set to the corresponding values associated with the PDCP SDU. The unencrypted PDCP SDU is transmitted together with PDCP header to the receiver.

Figure 7:
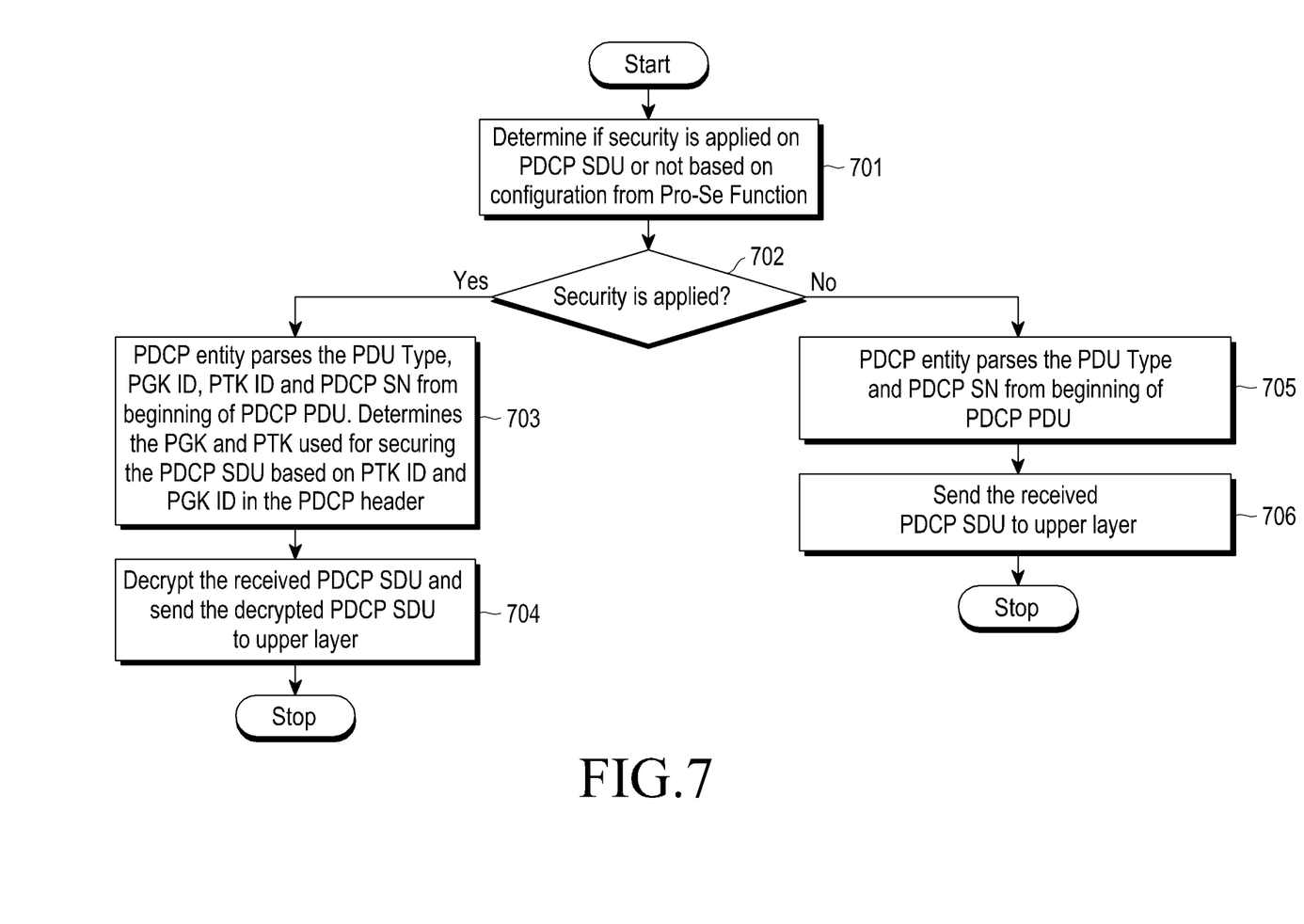
FIG. 7 is a flowchart illustrating a PDCP entity operation in the receiver according to an embodiment of the present disclosure.

FIG. 7 is a flowchart illustrating a PDCP entity operation in the receiver according to an embodiment of the present disclosure.

Referring to FIG. 7, in this embodiment of the present disclosure, the receiver already knows whether or not the security feature is applied to the PDCP SDU based on configuration information received from a network (which is stored in the secure element (UICC) of the device). In an embodiment of the present disclosure, whether or not the security feature (e.g., ciphering) is applied is configured by the pro-se key management function or pro-se function in the network. In an embodiment of the present disclosure, the upper layer indicates to PDCP whether or not the security feature is applied to PDCP SDUs. If the security feature is applied, the PDCP entity parses the PDCP header comprising of the PDU type, PGK ID, PTK ID, and PDCP SN. The PDCP entity then determines the PGK and PTK used for securing the PDCP SDU based on the PTK ID and PGK ID in the PDCP header. If the security feature is not applied, then the PDCP entity parses the PDCP header comprising of the PDU type and PDCP SN (as the receiver knows that the PGK ID and PTK ID are not included in the PDCP header).

At operation 701, the receiver determines if the security feature is to be applied on PDCP SDU or not based on configuration information from pro-se function. At operation 702, the security feature is either applied or not based on information received from the operation 701. At operation 703, the PDCP entity parses the PDU type, PGK ID, and PDCP SN from the beginning of the PDCP PDU, and determines the PGK and PTK used for securing the PDCP SDU based on the PTK ID and PGK ID in the PDCP header. At operation 704, the received PDCP SDU is decrypted and sent to upper layer. In an embodiment of the present disclosure, the upper layer includes, but is not limited to, NAS protocol, pro-se protocol, application, IP protocol, ARP protocol, and signaling protocol.

At operation 705, the PDCP entity parses the PDU type and PDCP SN from the beginning of the PDCP PDU. Alternately, at operation 705, the PDCP entity parses the PDU type from the beginning of the PDCP PDU. At operation 706, the received PDCP SDU is sent to upper layer. In an embodiment of the present disclosure, the upper layer includes, but is not limited to, NAS protocol, pro-se protocol, application, IP protocol, ARP protocol, and signaling protocol.

Embodiment 3

Figure 8:
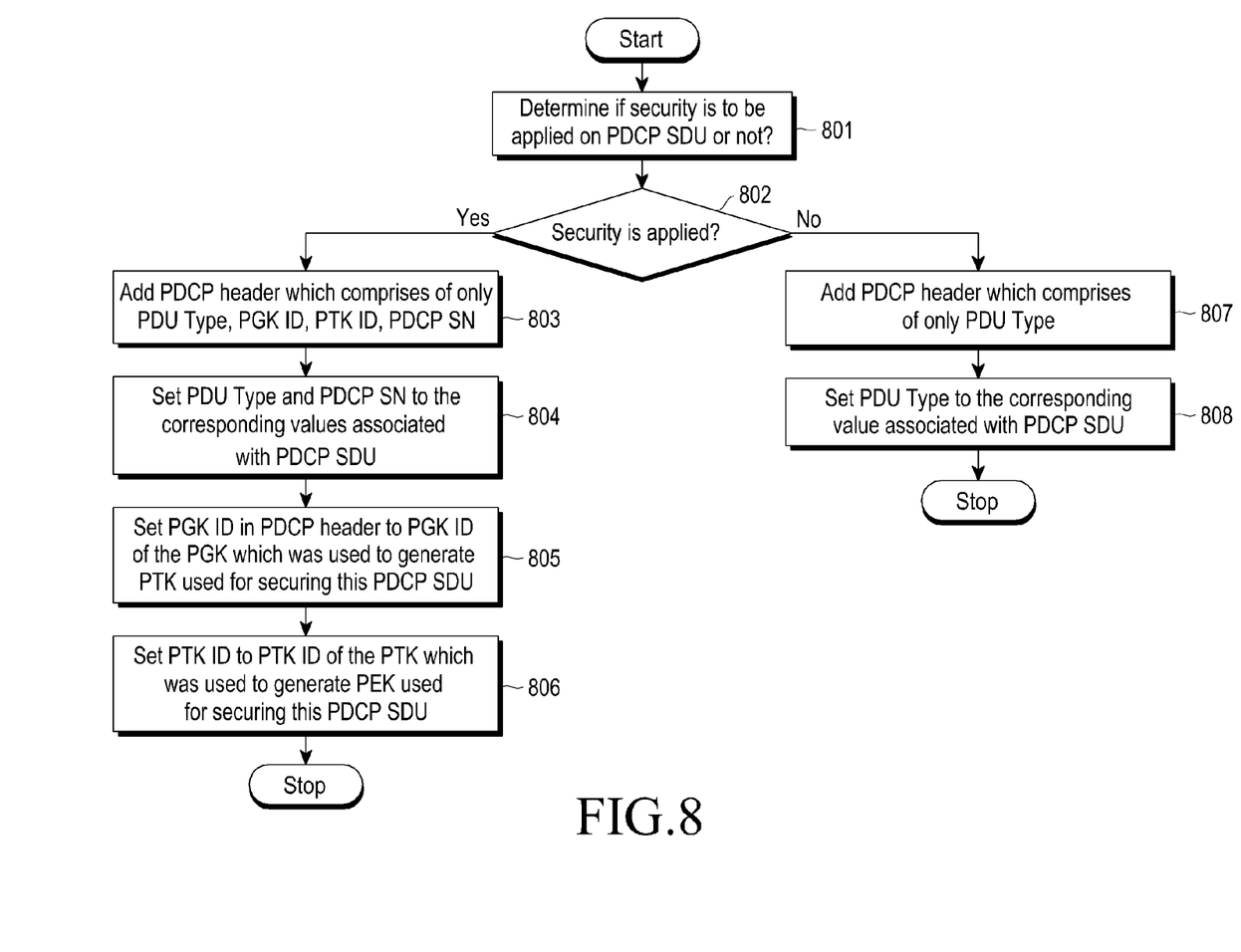
FIG. 8 is a flowchart illustrating a PDCP entity operation in the transmitter for generating the PDCP PDU according to an embodiment of the present disclosure.

FIG. 8 is a flowchart illustrating a PDCP entity operation in the transmitter for generating the PDCP PDU according to an embodiment of the present disclosure.

Referring to FIG. 8, in this embodiment of the present disclosure, the transmitter adds a different type of PDCP header depending on whether or not the security feature is applied on the data (i.e., a PDCP SDU). In an embodiment of the present disclosure, the pro-se configuration information provided by the network (which is stored in the secure element (UICC) of the device) indicates to PDCP whether or not the security feature should be applied to PDCP SDUs by the PDCP entity for a particular destination ID, all destination IDs, or a particular PDU SDU type (e.g., a relay SDU, signaling SDU, ARP SDU, etc.). In an embodiment of the present disclosure, whether or not the security feature (e.g., ciphering) is applied is configured by the pro-se key management function or pro-se function in the network. In an embodiment of the present disclosure, the upper layer indicates to PDCP whether or not the security feature should be applied to PDCP SDUs. Whether or not the security feature (e.g., ciphering) should be applied to PDCP SDUs, can be indicated for a particular destination ID, for all destination IDs, or for a particular PDU SDU type (e.g., a relay SDU, signaling SDU, ARP SDU, etc.). Upper layer may indicate not to apply the security feature in PDCP if the security is already applied to the PDCP SDU at the upper layer. If the security feature is applied, then PDCP generates the PDCP PDU by adding the PDCP header and setting the PDU type, PGK ID, PTK ID, and PDCP SN associated with the PDCP SDU in the PDCP PDU. If the security feature is not applied, then PDCP generates the PDCP PDU by adding the PDCP header, wherein the PDCP header comprises of the PDU type only. The field PDU type is set to the PDU type associated with the PDCP SDU in the PDCP PDU. The PGK ID, PTK ID, and PDCP SN fields are not included in the PDCP header. The PDCP SN is not maintained since the security feature is not applied.

In an embodiment of the present disclosure, an indicator is provided in the PDCP header which indicates whether or not the PGK ID, PTK ID, and PDCP SN are included in the PDCP header.

At operation 801, the transmitter determines if the security feature is to be applied on PDCP SDU or not. At operation 802, the security feature is either applied or not based on information received from the operation 801. At operation 803, the PDCP entity encrypts the PDCP SDU, and the PDCP header is added which comprises of only the PDU Type, PGK ID, PTK ID, and PDCP SN when the security feature is applied. At operation 804, the PDU Type and PDCP SN are set to the corresponding values associated with the PDCP SDU. At operation 805, the PGK ID in the PDCP header is set to the PGK ID of the PDG which was used to generate the PTK used for securing this PDCP SDU. At operation 806, the PTK ID is set to the PTK ID of the PTK which was used to generate the PEK used for securing this PDCP SDU. The encrypted PDCP SDU is transmitted together with the PDCP header to the receiver.

At operation 807, PDCP entity does not encrypt the PDCP SDU and the PDCP header is added which comprises of only the PDU type, when the security feature is not applied. At operation 808, the PDU type is set to the corresponding value associated with the PDCP SDU. The unencrypted PDCP SDU is transmitted together with the PDCP header to the receiver.

Figure 9:
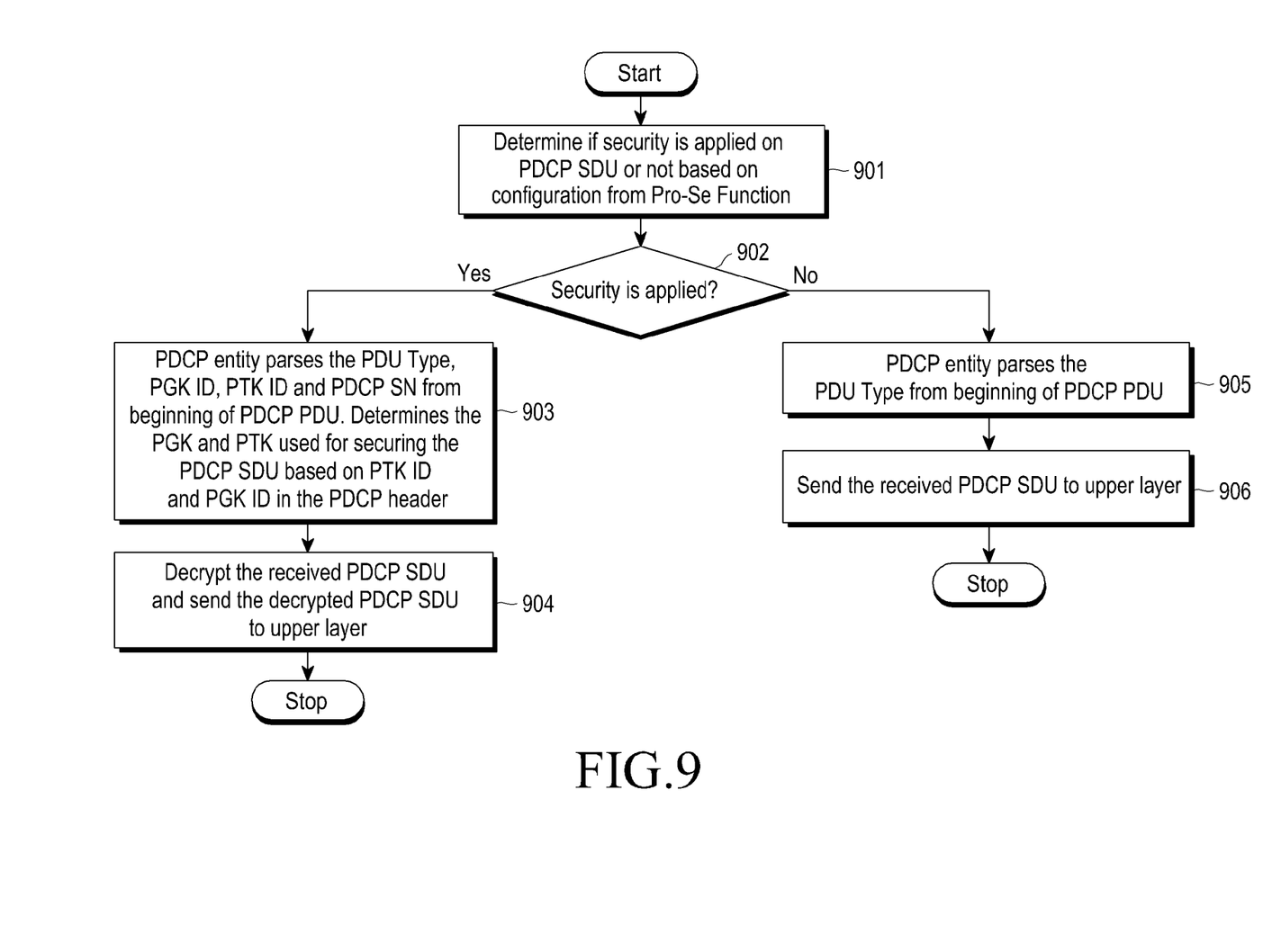
FIG. 9 is a flowchart illustrating a PDCP entity operation in the receiver according to an embodiment of the present disclosure.

FIG. 9 is a flowchart illustrating a PDCP entity operation in the receiver according to an embodiment of the present disclosure.

Referring to FIG. 9, in this embodiment of the present disclosure, the receiver already knows whether or not the security feature is applied to the PDCP SDU based on configuration information received from network (which is stored in the secure element (UICC) of the device). In an embodiment of the present disclosure, the upper layer indicates to PDCP whether or not the security feature is applied to PDCP SDUs. If the security feature is applied, the PDCP entity parses the PDCP header comprising of the PDU type, PGK ID, PTK ID, and PDCP SN. The PDCP entity then determines the PGK and PTK used for securing the PDCP SDU based on the PTK ID and PGK ID in the PDCP header. If the security feature is not applied, then the PDCP entity parses the PDCP header comprising of the PDU type only (as the receiver knows that the PGK ID and PTK ID are not included in the PDCP header).

At operation 901, the receiver determines if the security feature is to be applied on PDCP SDU or not based on configuration information from pro-se function. At operation 902, the security feature is either applied or not based on information received from the operation 901. At operation 903, the PDCP entity parses the PDU type, PGK ID, PTK ID, and PDCP SN from the beginning of the PDCP PDU, and determines the PGK and PTK used for securing the PDCP SDU based on the PTK ID and PGK ID in the PDCP header, when the security feature is applied. At operation 904, the received PDCP SDU is decrypted and sent to upper layer.

At operation 905, the PDCP entity parses the PDU type from the beginning of the PDCP PDU. At operation 906, the received PDCP SDU is sent to upper layer.

Embodiment 4

Figure 10:
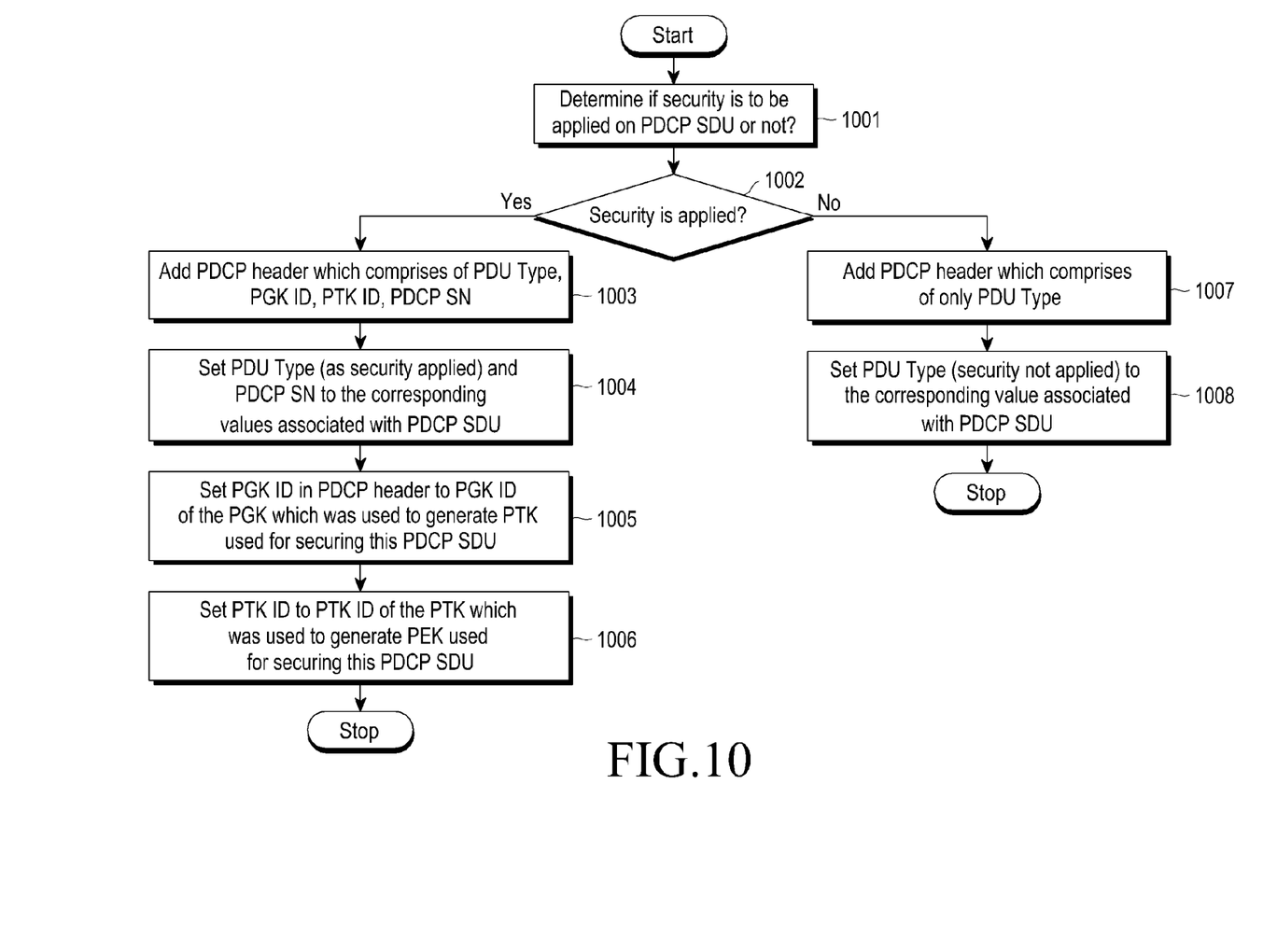
FIG. 10 is a flowchart illustrating a PDCP entity operation in the transmitter for generating the PDCP PDU according to an embodiment of the present disclosure.

FIG. 10 is a flowchart illustrating a PDCP entity operation in the transmitter for generating the PDCP PDU according to an embodiment of the present disclosure.

Referring to FIG. 10, in this embodiment of the present disclosure, the transmitter adds a different type of PDCP header depending on whether or not the security feature is applied on the data (i.e., a PDCP SDU). In an embodiment of the present disclosure, the pro-se configuration information provided by the network (which is stored in the secure element (UICC) of the device) indicates to PDCP whether or not the security feature should be applied to PDCP SDUs for a particular destination ID (which can be a group ID), all destination IDs, or a particular PDU SDU type (e.g., a relay SDU, signaling SDU, ARP SDU, etc.). In an embodiment of the present disclosure, whether or not the security feature (e.g., ciphering) is applied is configured by the pro-se key management function or pro-se function in the network. In an embodiment of the present disclosure, the upper layer indicates to PDCP whether or not the security feature should be applied to PDCP SDUs. Whether or not the security feature (e.g., ciphering) should be applied to PDCP SDUs, can be indicated for a particular destination ID, for all destination IDs, or for a particular PDU SDU type (e.g., a relay SDU, signaling SDU, ARP SDU, etc.). Upper layer may indicate not to apply the security feature in PDCP if the security is already applied to the PDCP SDU at the upper layer. If the security feature is applied, then PDCP generates the PDCP PDU by adding the PDCP header and setting the PDU type as secured (for example, if the PDU type indicates ARP and IP packets, then two additional types indicating unsecured ARP and unsecured IP are defined) and further adds the PGK ID, PTK ID, and PDCP SN associated with the PDCP SDU in the PDCP PDU. If the security feature is not applied, then PDCP generates the PDCP PDU by adding the PDCP header, wherein the PDCP header comprises of the PDU type only. The field PDU type is set to the PDU type associated with the PDCP SDU in the PDCP PDU as unsecured (i.e., the security feature is not applied). The PGK ID, PTK ID, and PDCP SN fields are not included in the PDCP header. The PDCP SN is not maintained since the security feature is not applied.

In an alternate embodiment of the present disclosure, an indicator can be in the PDCP header which indicates whether or not the PGK ID, PTK ID, and PDCP SN are included in the PDCP header.

At operation 1001, the transmitter determines if the security feature is to be applied on PDCP SDU or not. At operation 1002, the security feature is either applied or not based on information received from the operation 1001. At operation 1003, the PDCP header is added, which comprises of the PDU type, PGK ID, PTK ID, and PDCP SN when the security feature is applied. At operation 1004, the PDU type and PDCP SN are set to the corresponding values associated with the PDCP SDU.

At operation 1005, the PGK ID in the PDCP header is set to the PGK ID of the PGK which was used to generate the PTK used for securing this PDCP SDU. At operation 1006, the PTK ID is set to the PTK ID of the PTK which was used to generate the PEK used for securing this PDCP SDU.

At operation 1007, the PDCP header is added to data, which comprises of only the PDU type, when the security feature is not applied. At operation 1008, the PDU type is set to the corresponding value associated with the PDCP SDU.

Figure 11:
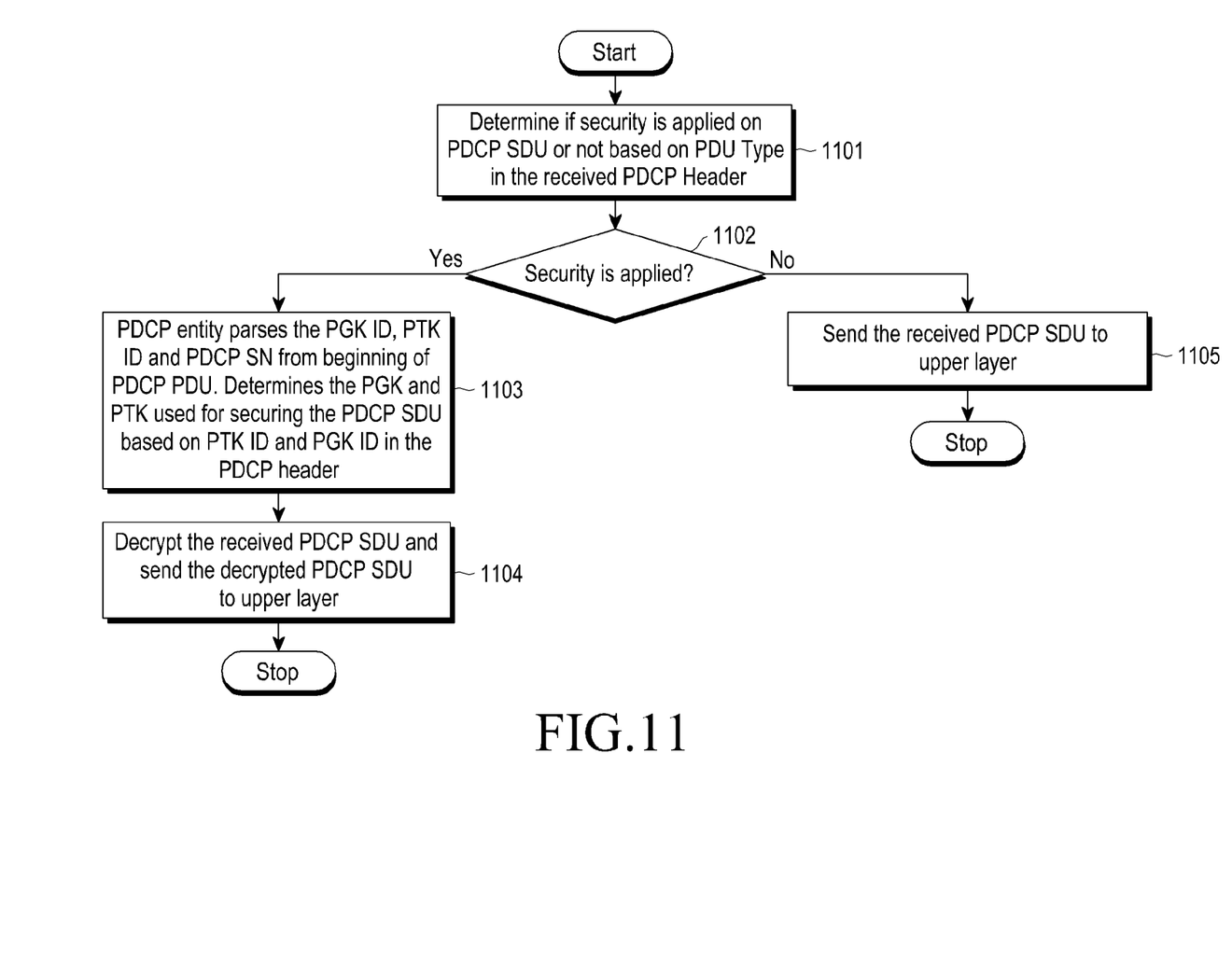
FIG. 11 is a flowchart illustrating a PDCP entity operation in the receiver according to an embodiment of the present disclosure.

FIG. 11 is a flowchart illustrating a PDCP entity operation in the receiver according to an embodiment of the present disclosure.

Referring to FIG. 11, in this embodiment of the present disclosure, the PDCP entity parses the PDCP header comprising of the PDU type, and based on the received PDU type knows whether or not the security feature is applied. If the PDU type indicates that the security feature is applied, then the PDCP entity further parses the PDCP header comprising of the PGK ID, PTK ID, and PDCP SN. The PDCP entity then determines the PGK and PTK used for securing the PDCP SDU based on the PTK ID and PGK ID in the PDCP header. If the security feature is not applied (based on the PDU type), then the PDCP entity further process the data packet without decrypting the packet (or verifying the message authentication code (MAC-I)).

At operation 1101, the receiver processes the data received from transmitter to determine if the security feature is applied on PDCP SDU or not based on the PDU type in the received PDCP header. At operation 1102, a check is performed of whether or not the security feature is applied based on information received from the operation 1101. At operation 1103, the PDCP entity parses the PGK ID, PTK ID, and PDCP SN from the beginning of the PDCP PDU, and determines the PGK and PTK used for securing the PDCP SDU based on the PTK ID and PGK ID in the PDCP header, when the security feature is applied. At operation 1104, the received PDCP SDU is decrypted and sent to upper layer.

At operation 1105, the received PDCP SDU is sent to upper layer without decryption, when the security feature is not applied. In an embodiment of the present disclosure, the upper layer includes, but is not limited to, NAS protocol, pro-se protocol, application, IP protocol, ARP protocol, and signaling protocol.

Embodiment 5

In an embodiment of the transmitter operation of the present disclosure, the transmitter adds a different type of PDCP header (as explained in solutions 1 to 4) depending on whether or not the security feature is applied on the data (i.e., a PDCP SDU). In an embodiment of the present disclosure, the pro-se configuration information provided by the network (which is stored in the secure element (UICC) of the device) indicates to the PDCP entity whether or not the security feature should be applied to the PDCP SDUs for a particular destination ID (which can be a group ID).

In an embodiment of the receiver operation of the present disclosure, the receiver knows whether or not the security feature is applied to the PDCP SDU based on configuration information received from pro-se function during the service authorization. Further the configuration information indicates, whether or not a particular device within a group will apply the security feature. For example, there are four devices (D1, D2, D3, D4) within a group performing D2D communication, where D1, D2, and D3 are subscribed for transmission and D4 is subscribed for only reception. In D4, the network configuration information indicates that, D1 and D3 will apply security feature and D2 will not apply security feature. In this case, when D4 receives data packets from D1 and D3, it knows the security feature will be applied and when D4 receives data packets from D2 it knows the security feature is not applied. The network decides the configuration information based on the device capability, subscription (i.e., a low priority device), and like so.

Embodiment 6

In an embodiment of the present disclosure during the transmitter operation, the transmitter adds a different type of PDCP header (as described in embodiments 1 to 4) depending on whether or not the security feature is applied on the data (i.e., a PDCP SDU). In an embodiment of the present disclosure, the transmitting device decides whether or not the security feature should be applied to the PDCP SDUs based on an application (for example, whether or not the application applies the security feature, applications sensitivity), an upper layer protocol (for example, if the upper layer protocol(s) is real-time transport protocol (RTP) and/or user datagram protocol (UDP) and/or hypertext transfer protocol over secure socket layer (HTTPS), no security feature will be applied), its security capability, and like so.

In an embodiment of the present disclosure, during the receiver operation, the receiver already knows whether or not the security feature is applied to the PDCP SDU based on configuration information received from pro-se function during the service authorization. Further, the configuration information may indicate whether or not a particular device within a group will apply the security feature. In an embodiment of the present disclosure, based on the indication/information received in the data packets, the receiver knows whether or not the security feature is applied (for example, using pre-defined values in the security information fields, based on the PDU type value in the PDCP header).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of transmitting data in a device to device communication system, the method comprising:
   determining whether a security feature is applied to a packet data convergence protocol (PDCP) service data unit (SDU);
   configuring a PDCP protocol data unit (PDU) based on the determined result; and
   transmitting the PDCP PDU to one or more receiving user equipments (UEs),
   wherein a PDCP header of the PDCP PDU includes a SDU type, a PDCP sequence number (SN), least significant bits of a pro-se group key (PGK) identification (ID) and a pro-se traffic key (PTK) ID, and
   wherein if the security feature is not applied to the PDCP SDU, the PDCP SN, the least significant bits of the PGK ID and the PTK ID are set to a zero value in the PDCP header.

2. The method of claim 1, wherein the determining of whether the security feature is applied to the PDCP SDU is based on pro-se configuration information received from a network.

3. The method of claim 1, wherein the determining of whether the security feature is applied to the PDCP SDU is based on one of a pro-se key management function and pro-se function in a network.

4. The method of claim 1, wherein the determining of whether the security feature is applied to the PDCP SDU is based on instructions received from an upper layer.

5. The method of claim 1, wherein the configuring of the PDCP PDU if the security feature is being applied to the PDCP SDU comprises:
   including the SDU type and the PDCP SN in the PDCP header of the PDCP PDU, wherein the PDCP SN and the SDU type are set to values associated with the PDCP SDU;
   including the least significant bits of the PGK ID in the PDCP header of the PDCP PDU, wherein the least significant bits of the PGK ID identifies a PGK used to generate a PTK for securing the PDCP SDU; and
   including PTK ID in the PDCP header of PDCP PDU, wherein the PTK ID identifies the PTK used to generate a pro-se encryption key (PEK) for securing the PDCP SDU.

6. The method of claim 1, wherein, if the security feature is not applied to the PDCP SDU, the SDU type is set to a value associated with the PDCP SDU.

7. A method of receiving data in a device to device communication system, the method comprising:
   receiving a packet data convergence protocol (PDCP) protocol data unit (PDU); and
   processing the PDCP PDU configured based on whether a security feature is applied to a PDCP service data unit (SDU),
   wherein a PDCP header of the PDCP PDU includes a SDU type, a PDCP sequence number (SN), least significant bits of a pro-se group key (PGK) identification (ID) and a pro-se traffic key (PTK) ID, and
   wherein, if the security feature is not applied to the PDCP SDU, the PDCP SN, the least significant bits of the PGK ID and the PTK ID are set to a zero value in the PDCP header.

8. The method of claim 7, wherein whether the security feature is applied to the PDCP SDU is determined based on pro-se configuration information received from a network.

9. The method of claim 7, wherein whether the security feature is applied to the PDCP SDU is determined based on one of a pro-se key management function and pro-se function in a network.

10. The method of claim 7, wherein whether the security feature is applied to the PDCP SDU is determined based on instructions received from an upper layer.

11. The method of claim 7, wherein the processing of the PDCP PDU comprises:
   determining the security feature applied status on the PDCP SDU based on configuration information from a pro-se function;
   determining a PGK and a PTK for securing the PDCP SDU based on the PTK ID and the PGK ID in the PDCP header by a PDCP entity if the security feature is applied to the PDCP SDU;
   decrypting the received PDCP SDU; and
   sending the decrypted PDCP SDU to an upper layer.

12. The method of claim 7, wherein the processing of the PDCP data unit comprises:
   determining the security feature applied status on the PDCP SDU based on configuration information from a pro-se function; and sending the PDCP SDU to an upper layer without decryption if the security feature is not applied to the PDCP SDU.

13. The method of claim 7, wherein the processing of the PDCP PDU comprises:
   determining the security feature applied on the PDCP SDU if the zero value is not assigned to the PDCP SN, the PGK ID, and the PTK ID;
   determining a PGK and a PTK for securing the PDCP SDU based on at least one of the PDCP SN, the PGK ID, or the PTK ID in the PDCP header if the security feature is applied to the PDCP SDU;
   decrypting the received PDCP SDU; and
   sending the decrypted PDCP SDU to an upper layer.

14. The method of claim 7, wherein the processing of the PDCP PDU comprises:
   determining the security feature is not applied on the PDCP SDU if the zero value is assigned to the PDCP SN, the PGK ID, and the PTK ID; and
   sending the received PDCP SDU to an upper layer without decryption.

15. An apparatus of transmitting data in a device to device communication system, the apparatus comprising:
   at least one processor configured to:
      determine whether a security feature is applied to a packet data convergence protocol (PDCP) service data unit (SDU), and
      configure a PDCP protocol data unit (PDU) based on the determined result; and
   a transmitter configured to transmit the PDCP PDU to one or more receiving user equipments (UEs),
   wherein a PDCP header of the PDCP PDU includes a SDU type, a PDCP sequence number (SN), least significant bits of a pro-se group key (PGK) identification (ID) and a pro-se traffic key (PTK) ID, and
   wherein, if the security feature is not applied to the PDCP SDU, the PDCP SN, the least significant bits of the PGK ID and the PTK ID are set to a zero value in the PDCP header.

16. The apparatus of claim 15, wherein whether the security feature is applied to the PDCP SDU is determined based on pro-se configuration information received from a network.

17. The apparatus of claim 15, wherein whether the security feature is applied to the PDCP SDU is determined based on one of a pro-se key management function and pro-se function in a network.

18. The apparatus of claim 15, wherein whether the security feature is applied to the PDCP SDU is determined based on instructions received from an upper layer.

19. The apparatus of claim 15,
   wherein if the security feature is being applied to the PDCP SDU:
      the PDCP SN and the SDU type are set to values associated with the PDCP SDU,
      the PGK ID identifies the PGK used to generate a PTK for securing the PDCP SDU, and
      the PTK ID identifies the PTK used to generate a PEK for securing the PDCP SDU.

20. The apparatus of claim 15, wherein, if the security feature is not applied to the PDCP SDU, the SDU type is set to a value associated with the PDCP SDU.

21. An apparatus of receiving data in a device to device communication system, the apparatus comprising:
   a receiver for receiving a packet data convergence protocol (PDCP) protocol data unit (PDU); and
   at least one processor configured to process the PDCP PDU configured based on whether a security feature is applied to a PDCP service data unit (SDU),
   wherein a PDCP header of the PDCP PDU includes a SDU type, a PDCP sequence number (SN), least significant bits of a pro-se group key (PGK) identification (ID) and a pro-se traffic key (PTK) ID, and
   wherein, if the security feature is not applied to the PDCP SDU, the PDCP SN, the least significant bits of the PGK ID and the PTK ID are set to a zero value in the PDCP header.

22. The apparatus of claim 21, wherein whether the security feature is applied to PDCP SDU is determined based on pro-se configuration information received from a network.

23. The apparatus of claim 21, wherein whether the security feature is applied to the PDCP SDU is determined based on one of a pro-se key management function and pro-se function in a network.

24. The apparatus of claim 21, wherein whether the security feature is applied to PDCP SDU is determined based on instructions received from an upper layer.

25. The apparatus of claim 21, wherein the at least one processor is further configured to:
   determine the security feature applied status on the PDCP SDU based on configuration information from a pro-se function,
   determine a PGK and a PTK for securing the PDCP SDU based on the PTK ID and the PGK ID in the PDCP header by a PDCP entity if the security feature is applied to the PDCP SDU,
   decrypt the received PDCP SDU, and
   control to send the decrypted PDCP SDU to an upper layer.

26. The apparatus of claim 21, wherein the at least one processor is further configured to:
   determine the security feature applied status on the PDCP SDU based on configuration information from a pro-se function, and
   control to send the PDCP SDU to an upper layer without decryption if the security feature is not applied to the PDCP SDU.

27. The apparatus of claim 21, wherein the at least one processor is further configured to:
   determine the security feature applied on the PDCP SDU if the zero value is not assigned to the PDCP SN, -the PGK ID, and the PTK ID,
   determine a PGK and a PTK for securing the PDCP SDU based on at least one of the PDCP SN, the PGK ID, or the PTK ID in the PDCP header if the security feature is applied to the PDCP SDU,
   decrypt the received PDCP SDU, and
   control to send the decrypted PDCP SDU to an upper layer.

28. The apparatus of claim 21, wherein the at least one processor is further configured to determine the security feature is not applied on the PDCP SDU if the zero value is assigned to the PDCP SN, the PGK ID, and the PTK ID, and controls to send the received PDCP SDU to an upper layer without decryption.

* * * * *